(12) United States Patent
Symanow et al.

(10) Patent No.: US 10,427,537 B2
(45) Date of Patent: Oct. 1, 2019

(54) VEHICLE POWER SUPPLY CONTROL

(71) Applicant: FORD GLOBAL TECHNOLOGIES, LLC, Dearborn, MI (US)

(72) Inventors: David Anthony Symanow, Plymouth, MI (US); Marvin Paul Kraska, Dearborn, MI (US); Michael Duane Wallace, Chesterfield, MI (US); Evan Perry, Lake Orion, MI (US); Derek Hartl, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 15/294,082

(22) Filed: Oct. 14, 2016

(65) Prior Publication Data

US 2018/0105058 A1 Apr. 19, 2018

(51) Int. Cl.
| | |
|---|---|
| *B60L 11/18* | (2006.01) |
| *B60L 1/00* | (2006.01) |
| *B60L 58/13* | (2019.01) |
| *B60L 58/20* | (2019.01) |

(52) U.S. Cl.
CPC ............ *B60L 11/1862* (2013.01); *B60L 1/00* (2013.01); *B60L 58/13* (2019.02); *B60L 58/20* (2019.02); *B60L 2210/12* (2013.01); *B60L 2240/547* (2013.01); *Y02T 10/7005* (2013.01); *Y02T 10/7044* (2013.01); *Y02T 10/7066* (2013.01); *Y02T 10/7233* (2013.01)

(58) Field of Classification Search
USPC ........................................................ 320/109
See application file for complete search history.

(56) References Cited

U.S. PATENT DOCUMENTS

| | | | |
|---|---|---|---|
| 8,527,129 B2 | 9/2013 | Atluri et al. | |
| 9,347,414 B2 | 5/2016 | Proebstle | |
| 2011/0298624 A1* | 12/2011 | Bauman | H02J 7/14 320/109 |
| 2014/0200755 A1* | 7/2014 | Sisk | B60L 11/12 701/22 |

* cited by examiner

*Primary Examiner* — Robert Grant
(74) *Attorney, Agent, or Firm* — David Kelley; Brooks Kushman P.C.

(57) ABSTRACT

A vehicle includes a power converter electrically coupled to an auxiliary battery and an electrical load. A vehicle voltage control system includes a controller programmed command an output voltage of the power converter to a voltage that is a maximum of target voltages associated with electrical loads that are electrically coupled to the auxiliary battery and activated, a battery charging voltage when a demand for auxiliary battery charging is present, and a float voltage associated with the auxiliary battery.

15 Claims, 3 Drawing Sheets

VEHICLE POWER SUPPLY CONTROL

TECHNICAL FIELD

This application generally relates to control of a power converter coupled between a high-voltage bus and a low-voltage bus of a vehicle.

BACKGROUND

Electrified vehicles include a high-voltage power network and a low-voltage power network. Much development effort is focused on optimizing power consumption and performance of the high-voltage power network. For example, improving the efficiency of inverters and electric machines electrically coupled to the high-voltage power network can help reduce power consumption. Components coupled to the high-voltage power network are typically controlled by electronic modules that draw power from the low-voltage power network. In addition, many electrical components are coupled only to the low-voltage power network.

SUMMARY

A vehicle includes a power converter electrically coupled to an auxiliary battery and an electrical load. The vehicle further includes a controller programmed to command an output voltage of the power converter to a voltage that is a maximum of (i) target voltages associated with electrical loads that are electrically coupled to the auxiliary battery and activated, (ii) a battery charging voltage when a demand for auxiliary battery charging is present, and (iii) a float voltage associated with the auxiliary battery.

A vehicle voltage control system includes a power converter electrically coupled to an auxiliary battery. The vehicle voltage control system further includes a controller programmed to command an output voltage of the power converter to a voltage that is a maximum of (i) target voltages associated with electrical loads that are activated, (ii) a battery charging voltage when a demand for auxiliary battery charging is present, and (iii) a float voltage associated with the auxiliary battery.

A method includes operating, by a controller, a power converter electrically coupled to an auxiliary battery and a plurality of electrical loads at an output voltage that is a maximum of (i) target voltages associated with each of the electrical loads that are activated, (ii) a charging voltage for the auxiliary battery when a demand for auxiliary battery charging is present, and (iii) a float voltage associated with the auxiliary battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
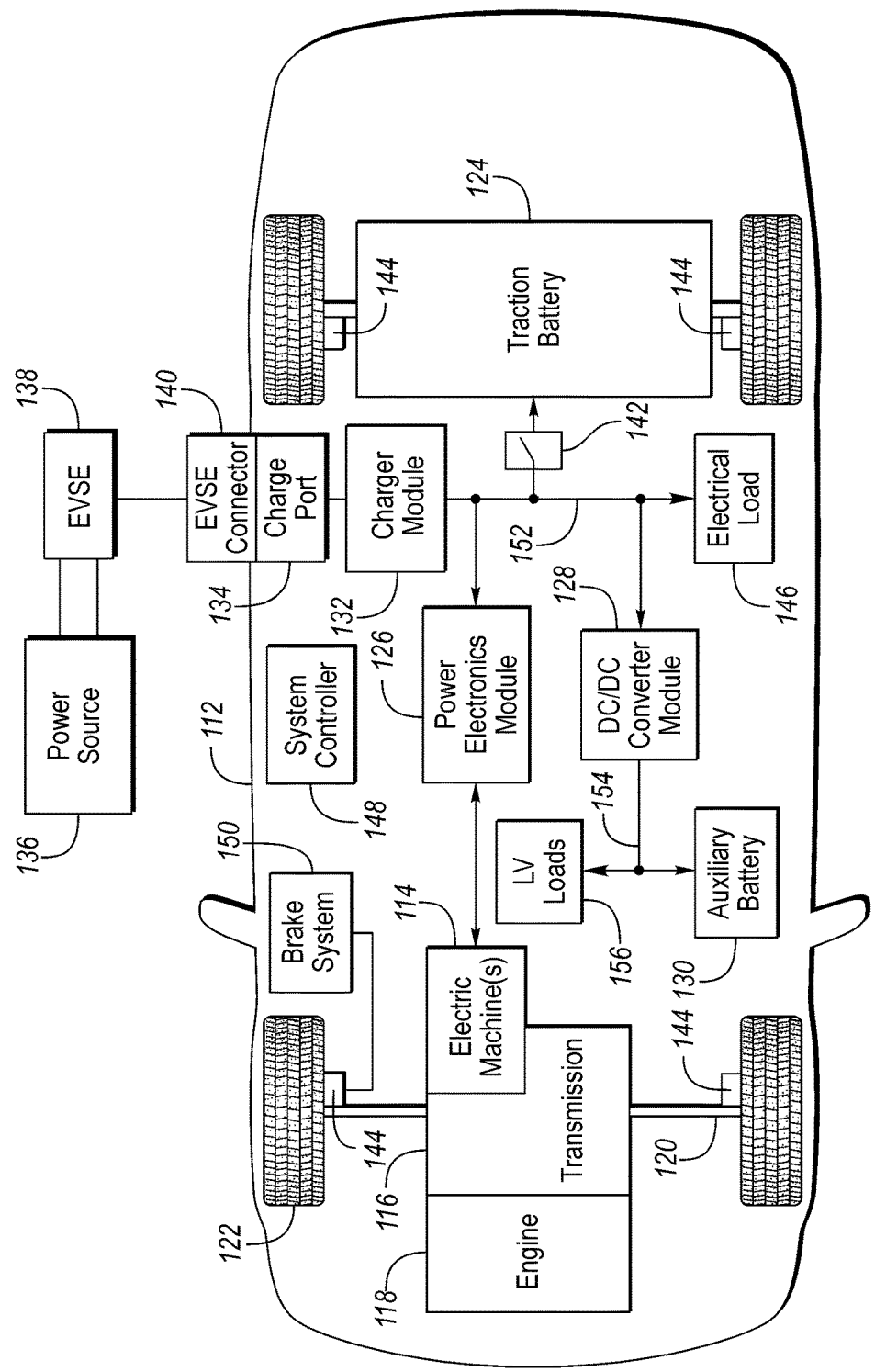
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Electrified vehicles generally contain two electrical systems that operate at different voltages. The high-voltage electrical system includes those components that are coupled to the high-voltage bus 152 and operate at relatively high-voltage levels (e.g., 200-600 Volts). The high-voltage components include the power electronics module 126. A low-voltage electrical system includes those electrical loads coupled to the low-voltage bus 154 that operate at relatively low-voltage levels (e.g., 12 Volts) and support various chassis features such as electric steering-assistance and brakes, control modules, sensors, actuators, and customer convenience features. The low-voltage bus 154 receives power through the DC/DC converter 128 which transfers energy from the high-voltage bus 152 to the low-voltage bus 154. The energy used for both electrical systems is derived from fuel used by the internal combustion engine 118 or from energy stored in the traction battery 124 via external charging. Any component that draws current from the low-voltage bus 154 may be considered an electrical load.

Low-voltage electrical system energy consumption affects vehicle fuel economy. The low-voltage bus 154 receives power from the DC/DC converter 128. The DC/DC converter is powered from the high-voltage bus 152. During vehicle drive cycles (e.g., ignition in run and not connected to EVSE 138), power for the high-voltage bus 152 is provided by the traction battery 124 or the electric machines 114 acting as generators. The traction battery 124 may be recharged via the electric machines 114 during the drive cycle. The electric machines 114 are rotated by the engine 118 which burns fuel. As such, a portion of the fuel consumed by the engine 118 may be attributed to supplying power to the low-voltage bus 154. The amount of fuel consumed for supporting the low-voltage bus 154 may depend upon drive cycle length, the amount of charge in the traction battery 124 and the power demands on the low-voltage bus 154.

Simulation analyses and dynamometer testing indicate that, contingent upon vehicle drive cycle, feature content, and customer usage profile, the low-voltage electrical system may be responsible for up to 35% of the fuel consumption in a typical hybrid electric vehicle. Efforts to improve the fuel economy performance of future high-voltage electrified powertrains are the subject of substantial research and development efforts. At the same time, the demand for new low-voltage features, and performance enhancements to existing low-voltage components, has led to a growing need for increasing amounts of low-voltage power. The magnitude of the growth of low-voltage power requirements has the potential to offset the fuel economy improvements planned for the future electrified powertrains. Consequently, methods to improve HEV fuel economy by optimizing low-voltage electrical system energy consumption are of great benefit.

Testing on electrified vehicles has yielded several observations regarding energy consumption attributed to the low-voltage system. First, the power consumption of the low-voltage system changes linearly with the voltage. Second, an unnecessary increase in the low-voltage system supply voltage degrades fuel economy by increasing the total energy used by the system while providing no customer-perceivable benefits. Third, charging of the auxiliary battery 130 can consume a significant amount of fuel during a drive cycle and is a measurable source of variability in dynamometer fuel economy test results.

Figure 2:
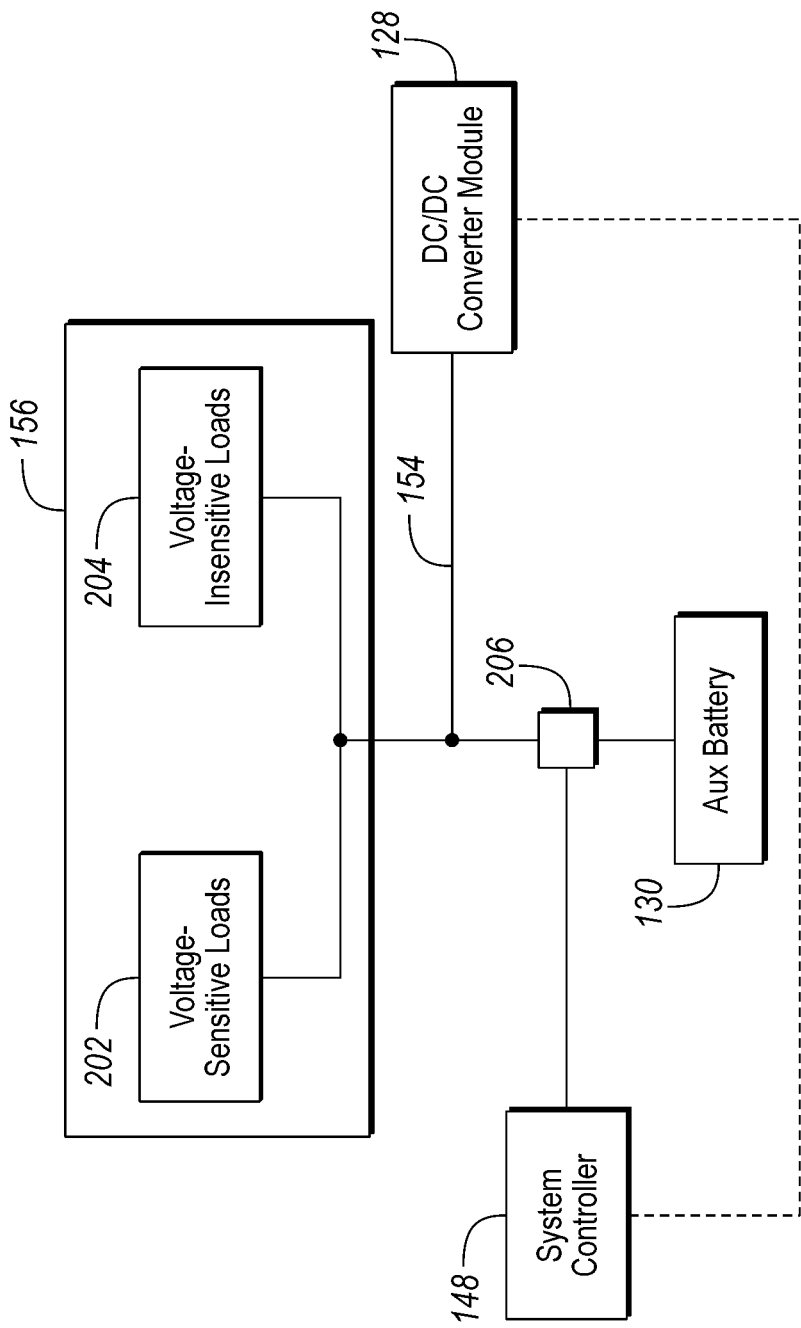
FIG. 2 depicts a possible configuration for a vehicle voltage control system.

FIG. 2 depicts a possible configuration for modules coupled to the low-voltage bus 154. The low-voltage loads 156 may include voltage-sensitive loads 202 and voltage-insensitive loads 204. The voltage-sensitive loads 202 may be defined as those electrical loads that, when activated and operating, require specific power supply voltages to achieve acceptable parametric performance. For example, the voltage-sensitive loads 202 may include climate control fans and heated glass. A characteristic of the voltage-sensitive loads 202 is that their performance depends on the voltage supplied being at least equal to a target operating voltage. When the voltage supplied is less than the target operating voltage, a change in performance may be recognized by a vehicle occupant or operator. For example, a climate control system may operate a fan to cause an expected amount of air flow on a particular manual speed setting. Changes in the voltage supplied to the fan may affect the speed of the fan and the actual amount of air flow. Such changes may be noticeable to vehicle occupants. It may be desirable to operate the voltage-sensitive loads 202 at or near the target operating voltage to maintain consistent and predictable performance. The target operating voltage may be a voltage level for achieving an expected performance level of the associated voltage-sensitive load 202.

The voltage-insensitive loads 204 may be defined as those electrical loads whose performance is relatively independent of the power supply voltage, so long as the power supply voltage is within a nominal operating range (e.g., 9-18 Volts). For example, the voltage-insensitive loads 204 may include electronic modules. The electronic modules require a minimum voltage to operate. As many electronic modules may regulate the voltage supplied to a lower voltage to power internal components, performance may not affected by the power supply voltage. Any change in the power supply voltage within the nominal voltage range does not cause a change in performance of the load. In addition, such variations in the voltage to the electronic modules are not perceptible by vehicle occupants.

The vehicle 112 may further include a sensor module 206. The sensor module 206 may include a voltage sensor configured to provide a signal indicative of the voltage level of the low-voltage bus 154. The sensor module 206 may also include a current sensor configured to provide a signal indicative of the current flowing through the auxiliary battery 130. For example, the current sensor may be a Hall-effect type sensor. The system controller 148 may interface with the sensor module 206 to receive the voltage and current signals. The system controller 148 may include circuitry to scale, filter, and isolate the voltage and current signals.

A battery (e.g., auxiliary battery 130, traction battery 124) may be constructed from a variety of chemical formulations. Typical battery chemistries include lead acid, nickel-metal hydride (NIMH) and Lithium-Ion. It may be useful to calculate various battery characteristics. Quantities such as battery power capability, battery capacity, and battery state of charge may be useful for controlling battery operation.

Battery power capability is a measure of the maximum amount of power the battery can provide or the maximum amount of power that the battery can receive at a given time. Knowing the battery power capability allows the electrical power demands to be managed such that the power requested is within recommended battery limits.

Battery capacity is a measure of a total amount of energy that may be stored in the battery. The battery capacity may be expressed in units of Amp-hours. Values related to the battery capacity may be referred to as amp-hour values. The battery capacity may decrease over the life of the battery.

State of charge (SOC) gives an indication of how much charge remains in the battery. The SOC may be expressed as a percentage of the charge presently stored in the battery relative to the battery capacity. The SOC value may be output to a display to inform the driver of how much charge remains in the battery, similar to a fuel gauge. Calculation of SOC can be accomplished by a variety of methods. One possible method of calculating SOC is to perform an integration of the battery current over time. This is well-known in the art as ampere-hour integration. Additionally, a relationship between an open-circuit voltage of the battery measured after a rest period and the state of charge may be known. The SOC may be utilized to determine when the battery has achieved a full charge. A full charge level may be detected when the SOC is greater than a predetermined threshold (e.g., 95%). The predetermined threshold may be an SOC value above which a manufacturer discourages operation of the battery. The predetermined threshold may depend upon the battery chemistry and the operating conditions of the battery.

The system controller 148 may monitor the current and voltage of the auxiliary battery 130 to estimate the present operational capability of the auxiliary battery 130. For example, the SOC of the auxiliary battery 130 may be estimated by an ampere-hour integration of the measured current over time. A preferred SOC operating range may be known for the auxiliary battery 130. A minimum SOC may be defined as an SOC level below which charging is desired. The control strategies implemented in the system controller 148 may be configured to maintain the SOC of the auxiliary battery 130 at a level greater than the minimum SOC. For example, if the SOC of the auxiliary battery 130 falls below the minimum SOC, charging of the auxiliary battery 130 may be initiated. In addition, a maximum SOC may be defined as an SOC level above which charging should be terminated. For example, charging of the auxiliary battery 130 may be accomplished by requesting the output voltage of the DC/DC converter 128 be a predetermined charging voltage.

The voltage level of the low-voltage bus 154 may change as the current demanded by the low-voltage loads 156 changes. The voltage of the low-voltage bus 154 may be controlled by the DC/DC power converter 128 (hereinafter referred to as the power converter 128). The power converter 128 may include switching devices that selectively couple the high-voltage bus 152 terminals to circuity that is coupled to the low-voltage bus 154. By activating and deactivating the switching devices at particular times and for particular durations, the output voltage of the power converter 128 can be controlled to a particular voltage. The power converter 128 may be configured to control an output voltage to a selected voltage level by operating the switching devices.

The power converter 128 may implement a closed-loop control system to drive the output voltage to a voltage set-point. The power converter 128 may include circuitry to measure the input voltage (e.g., high-voltage bus voltage) and the output voltage (e.g., low-voltage bus voltage). The power converter 128 may continually monitor the input voltage and the output voltage and adjust the switching times to achieve the desired output voltage.

The system controller 148 may communicate via the vehicle network with the power converter 128 to request the voltage level of the low-voltage bus 154 (e.g., provide the voltage set-point). The system controller 148 may request changes to the voltage output of the power converter 128 as operating conditions change. The power converter output voltage requested may depend on the power demands of the auxiliary battery 130 and the low-voltage electrical loads 156. As the current demand on the low-voltage bus 154 changes, the power converter 128 may adjust the switching times and durations to maintain the output voltage at the desired voltage.

To charge the auxiliary battery 130 a charging voltage may be applied to the low-voltage bus 154. Power consumption when charging the auxiliary battery 130 is non-linear with respect to the voltage. To charge the auxiliary battery 130, the charging voltage must be at a level that exceeds an open-circuit voltage of the auxiliary battery 130. A typical electrical model for a battery consists of a resistor coupled between a voltage source and a terminal of the battery. During discharge, the voltage source provides current through the resistor and to an electrical load connected between terminals of the battery. During charge, current flows from the terminal through the resistor to the voltage source. The voltage level of the voltage source may be referred to as the open-circuit voltage of the battery. The open-circuit voltage may depend on a state of charge, temperature, and age of the auxiliary battery 130. During discharging, the terminal voltage of the battery is generally less than the open-circuit voltage. During charging, the terminal voltage of the battery is generally greater than the open-circuit voltage.

The open-circuit voltage may be measured as the voltage at the terminals of the battery when there is no load connected to the terminals. With no load connected to the battery, no current flows through the battery resistance and the voltage levels of the voltage source and the voltage across the battery terminals (also called the terminal voltage) are the same. When no loads are connected between the battery terminals, a measurement of the terminal voltage yields the open-circuit voltage. Under this open-circuit condition, the terminal voltage and the open-circuit voltage are at the same level. The measurement may be done after a sufficient rest period has expired to allow the battery to settle.

Conditions may be slightly different when a load is connected to the battery terminals. When the auxiliary battery terminals are connected to the low-voltage bus 154, the voltage at the auxiliary battery terminals when no current flows to or from the auxiliary battery 130 may be referred to as the float voltage. Under ideal conditions, the float voltage is the same as the open-circuit voltage. When no current flows to or from the auxiliary battery 130 the float voltage and the open-circuit voltage are at the same voltage level.

However, in practice the voltage at the auxiliary battery terminals may vary according to changes in current demand on the low-voltage bus 154. Under these conditions, small transient changes in the auxiliary battery terminal voltage may cause the auxiliary battery 130 to cycle rapidly between charging and discharging. This condition may be referred to as micro-cycling. Excessive micro-cycling can reduce the life of the auxiliary battery 130 and, as such, methods to reduce micro-cycling may be beneficial.

The float voltage may be estimated during vehicle operation. The system controller 148 may estimate the open-circuit voltage of the auxiliary battery 130 in different ways. The system controller 148 may be programmed to implement a model of the auxiliary battery 130 and identify model parameters based on current and voltage measurements. For example, the model may be used with a Kalman filter to estimate the states and parameters of the model. The system controller 148 may store data relating state of charge to the open-circuit voltage. The system controller 148 may be programmed to estimate the state of charge using an ampere-hour integration algorithm. Based on the estimated state of charge, the open-circuit voltage can be determined with reference to the stored data (e.g., table lookup). Other methods are also available to provide a real-time estimate of the open-circuit voltage.

The system controller 148 may be programmed to actively determine the float voltage. The system controller 148 may implement a control strategy to control the current through the auxiliary battery 130 to a minimum level by adjusting the float voltage. A closed-loop control strategy may be implemented that measure current from the current sensor and adjusts the float voltage to control the current to less than a predetermined limit.

The system controller 148 may be programmed to monitor and control the voltage level of the low-voltage bus 154. The system controller 148 may operate the low-voltage bus 154 in several different modes of operation by communicating the voltage set-point to the power converter 128. For example, a different voltage set-point value may be output for different modes of operation. An auxiliary battery charging mode may be defined. In the auxiliary battery charging mode, the voltage of the low-voltage bus 154 may be set to a level at which the auxiliary battery 130 may be charged. For example, the voltage of the low-voltage bus 154 may be set to a value within a range between 14.2 Volts and 15.5 Volts.

A voltage-sensitive load mode may be defined. In the voltage-sensitive load mode, the voltage of the low-voltage bus 154 may be set to a level at which the voltage-sensitive loads 202 are configured to operate. For example, the voltage for the low-voltage bus 154 may be set to a value of 13.5 Volts. In some configurations, each of the voltage-sensitive loads may have a target operating voltage. In the event that multiple voltage-sensitive loads 202 are active at the same time, the system controller 148 may operate the low-voltage bus 154 at the greatest of the target operating voltages of the active voltage-sensitive loads 202.

A fuel-efficient operating mode may be defined. In the fuel-efficient operating mode, the voltage of the low-voltage bus 154 may be set to a voltage level that minimizes the current flowing to and from the auxiliary battery 130. The voltage level of the low-voltage bus 154 may be set to a voltage at which no current flows to or from the auxiliary battery 130. In this mode, the power converter 128 may provide all of the power for the low-voltage electrical loads 156. The voltage level may be the float voltage. The fuel-efficient operating mode may be entered when there is no demand for auxiliary battery charging and no voltage-sensitive loads 202 are activated. The system controller 148 may be programmed to dynamically estimate the float voltage. The system controller 148 may receive a current measurement and implement a control strategy to maintain the magnitude of the current associated with the auxiliary battery 130 to less than a predetermined current. For example, proportional-integral control strategy may be implemented to adjust the output voltage as the current magnitude changes.

Operating states may be defined when the vehicle is not being operated (e.g., key-off modes). An off-plug, key-off load state may be defined when the vehicle is keyed off (e.g., ignition switch off) and that charge port 134 is not coupled to the EVSE connector 140 (e.g. off-plug). In this state, the auxiliary battery 130 provides power to the low-voltage electrical loads 156. An on-plug, key-off load state may be defined when the vehicle is keyed off and the charge port 134 is coupled to the EVSE connector 140 (e.g., on-plug). In this state, the auxiliary battery 130 may be charged and power to the low-voltage electrical loads 156 may be provided by the charger 132. For a wireless charging system, the on-plug state may be defined when a receive coil of the vehicle is in proximity and ready to receive power from a transmit coil associated with the EVSE 138.

The system controller 148 may be programmed to implement an adaptive low-voltage power supply control strategy. The control strategy may optimize low-voltage system energy consumption by adjusting the voltage of the low-voltage bus 154 as the operating demands change. The control strategy may respond to changes in active vehicle loads, battery state-of-health, and other factors.

Figure 3:
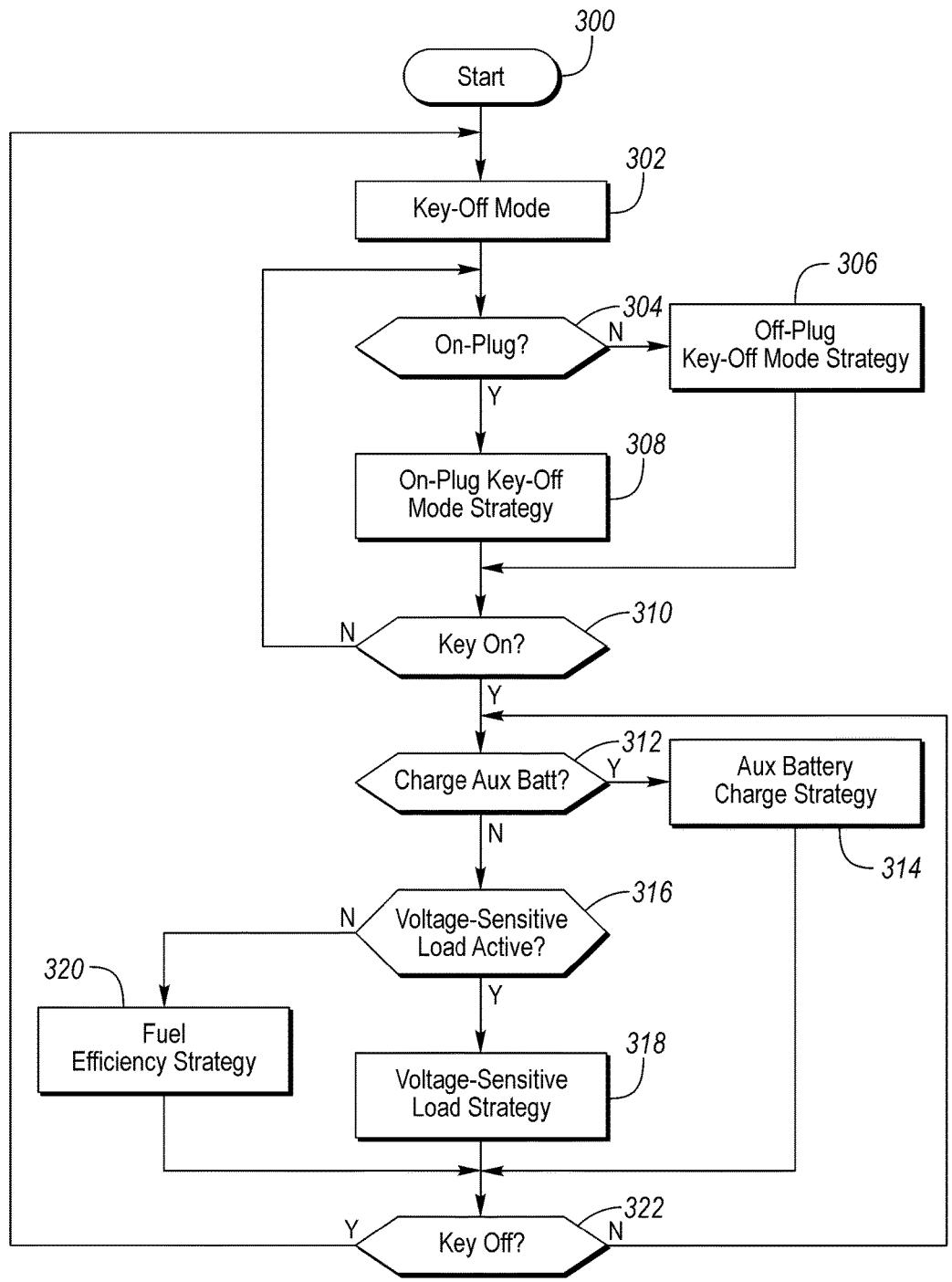
FIG. 3 depicts a flowchart for a possible sequence of operation for operating the vehicle voltage control system.

FIG. 3 depicts a flowchart of a possible sequence of operations that a controller may implement as part of a vehicle voltage control system that includes the power converter 128 and the auxiliary battery 130 and implemented as software/hardware in the system controller 148. At block 300, the sequence is started when power is applied to the low-voltage bus 154. At operation 302, the key-off mode is entered upon initial application of power. During the key-off mode, the controller 148 may be in a low-power mode and wake up periodically to check conditions of the electrical system. At operation 304, a check may be performed to determine if the vehicle is on-plug. For example, the vehicle is on-plug when the EVSE connector 140 is coupled to the charge port 134. If the vehicle is on-plug, operation 308 is performed. At operation 308, the on-plug key-off control strategy is performed. The controller 148 may communicate with the EVSE 138 during the on-plug key-off mode to control energy flow to the electrical system. The controller 148 may communicate with the power converter 128 to provide a voltage set-point for the low-voltage bus 154.

During the on-plug key-off mode, power is available from the external power source 136. This power may be used to charge the auxiliary battery 130 and satisfy the power demand of the low-voltage electrical loads 156. A possible control strategy in the on-plug key-off mode includes charging the auxiliary battery 130 to a full charge level (e.g., 100%). Any recharging performed while on-plug reduces the amount of energy that must be provided from the consumption of fuel on board the vehicle. Another possible control strategy includes implementing a low-charge acceptance mitigation strategy. For example, upon detecting a low-charge acceptance capability of the auxiliary battery 130, a special charging procedure may be performed to restore the charge acceptance capability. Such actions may improve the energy storage capability of the auxiliary battery 130 and, as a result, lead to an increase in fuel economy. Operation 310 is then performed to check for a key-on cycle.

If the vehicle is not on-plug, operation 306 is performed. At operation 306, the off-plug key-off strategy is performed. In the off-plug key-off mode, any power required from the low-voltage loads 156 is sourced from the auxiliary battery 130. During the off-plug key-off mode, the auxiliary battery 130 may discharge to meet the power demand. Discharging the auxiliary battery 130 can affect the fuel economy as the fuel is consumed while the vehicle is operating to provide energy to recharge the auxiliary battery 130. In addition, the size and capacity of the auxiliary battery 130 is determined by the power demand of the low-voltage loads 156 during key-off and the maximum duration of the key-off events.

Possible control strategies in the off-plug key-off mode include load shedding if the key-off event exceeds a predetermined duration (e.g., 3 days). Load shedding includes deactivating non-essential low-voltage loads so that no power is demanded by those loads from the auxiliary battery 130. Those low-voltage loads that are essential to restarting the vehicle may be maintained in an active state. By reducing power demand in the off-plug key-off mode, the auxiliary battery 130 maintains more energy and less fuel is required for recharging. Operation 310 is then performed to check for a key-on cycle.

At operation 310, a check is made for a key-on cycle. For example, a key-on cycle may be detected by insertion of a key into an ignition switch and moving the key to a run position. In other configurations, a key-on cycle may be detected when a start button is pressed. A key-on cycle generally indicates that the vehicle is in an operational mode in which propulsion may be possible. If a key-on cycle is not detected, the sequence of operations starting with 304 is repeated. If a key-on cycle is detected, operation 312 is performed.

At operation 312, a check is performed to determine if auxiliary battery charging is desired. For example, a state of charge of the auxiliary battery 130 may be compared to a predetermined threshold that is indicative of a low state of charge below which charging is desired. If the state of charge is less than the predetermined threshold, auxiliary battery charging may be initiated. If the auxiliary battery 130 is to be charged, operation 314 is performed.

At operation 314, the auxiliary battery charging strategy is performed. Operation 322 is then performed. The auxiliary battery charging strategy may include charging the auxiliary battery 130 with the greatest possible charging voltage that does not compromise durability of the auxiliary battery 130. During charging, the low-voltage bus 154 is operated at the auxiliary battery charging voltage. The controller 148 may communicate the desired auxiliary battery charging voltage to the power converter 128. Charging with the largest possible voltage minimizes the duration in which the auxiliary battery 130 is charged. The power converter 128 may then control the voltage level of the low-voltage bus 154 to the auxiliary battery charging voltage. In response to a demand for charging the auxiliary battery 130, the controller 148 may command an output voltage of the power converter 128 to a charging voltage that exceeds the float voltage and causes current to flow to the auxiliary battery 130.

The auxiliary battery charging strategy may implement a partial state of charge (PSoC) charging strategy. The PSoC charging strategy may charge the auxiliary battery 130 until a target SOC is achieved. The target SOC may correspond to an end of an efficient SOC charging range for the auxiliary battery 130. The charge-acceptance of the auxiliary battery 130 may be non-linear and vary with SOC, temperature, charging history, and battery age. At low SOC levels the charge acceptance of the auxiliary battery 130 may be at a peak level. That is, the ratio of energy stored in the auxiliary battery 130 to the energy from fuel burned for battery charging is greatest. As the SOC increases, the charging efficiency may decrease. A point may be reached at which continued battery charging is inefficient to the extent that charging should be halted (e.g., the customer benefit of additional charging is low). This threshold for halting charging varies with ambient temperature, battery size, and battery age.

The auxiliary battery charging strategy may also implement low-charge acceptance mitigation charging cycles. Such charging cycles may condition the auxiliary battery 130 to increase the charge acceptance of the auxiliary battery 130.

If the auxiliary battery 130 does not require charging, operation 316 is performed. At operation 316, a check is performed to determine if any voltage-sensitive loads 202 are active. A voltage-sensitive load 202 may be active when the load is drawing current from the low-voltage bus 154. The active status may be determined in a variety of ways. The voltage-sensitive loads 202 may interface with an associated control module that controls and manages the operation of the load. The control module for each of the voltage-sensitive loads 202 may transmit messages and/or signals indicative of the voltage-sensitive load 202 being active or inactive. The control module may also transmit a target bus voltage signal or message over the vehicle network. The target bus voltage signal may indicate the desired voltage level at which the corresponding electrical load should be operated to achieve an expected performance level. For example, the target voltage may be set to achieve a desired speed of a fan or brightness of a light. The controller may transmit a range of acceptable target bus voltages at which the load should be operated. In other configurations, the system controller 148 may store a table of target voltages for each of the voltage-sensitive loads 202 and set the voltage level based on the activation status of each of the voltage-sensitive loads 202. For example, the voltage level may be selected as the greatest of the target voltages of the activated voltage-sensitive loads 202.

If a voltage-sensitive load is active, operation 318 may be performed. At operation 318, the voltage-sensitive load strategy is performed. Operation 322 is then performed. Note that the voltage-sensitive load mode is implemented when there is no demand for charging of the auxiliary battery 130. The voltage applied to the low-voltage bus 154 for charging is greater than the voltage necessary to support the voltage-sensitive loads 202.

The voltage-sensitive load control strategy may request a low-voltage bus voltage that depends on the voltage-sensitive loads 202 that are presently activated. Each voltage-sensitive load 202 may request a different target bus voltage or target range of bus voltages. For best fuel economy, the control strategy may be configured to normally operate at the lowest bus voltage that satisfies the demands of all of the voltage-sensitive loads 202. The controller 148 may command an output voltage of the power converter 128 to a target voltage associated with the voltage-sensitive loads 202 that are presently activated or to be activated imminently.

If no voltage-sensitive loads 202 are active, then operation 320 is performed. At operation 320, the fuel efficiency control strategy is performed. Operation 322 is then performed. In response to deactivating the voltage-sensitive electrical loads 202, the controller 148 may command a reduction in the output voltage of the power converter to a voltage level that minimizes current flow to and from the auxiliary battery 130. The fuel efficiency control strategy may include operating the low-voltage bus 154 at a voltage level that minimizes current flow in and out of the auxiliary battery 130. For example, the voltage set-point may be set to the float voltage of the auxiliary battery 130. By operating the low-voltage bus 154 at the float voltage, the low-voltage system minimizes fuel consumption. As the auxiliary battery 130 is neither charging nor discharging, no fuel is being consumed to support the auxiliary battery 130.

The float voltage may be the open-circuit voltage of the auxiliary battery 130. In some configurations, the float voltage may be a predetermined offset greater than the open-circuit voltage such that no current flow from the auxiliary battery 130. In some configurations, the float voltage may be determined using a control strategy that measures the current flowing through the auxiliary battery 130 and changes the float voltage such that no current flow through the auxiliary battery 130. In some configurations, the float voltage may be determined using a control strategy that measures the current flowing through the auxiliary battery 130 and changes the float voltage such that a predetermined amount of current flows to the auxiliary battery. The predetermined amount of current flowing to the battery may be a generally small value that is selected to prevent micro-cycling. For example, a proportional-integral control strategy may be implemented for the closed-loop control of the float voltage.

The system controller 148 may be programmed to command an output voltage of the power converter 128 to a voltage that is a maximum of the target voltages associated with the electrical loads 202 that are electrically coupled to the auxiliary battery 130 and activated, a battery charging voltage when a demand for auxiliary battery charging is present, and a float voltage associated with the auxiliary battery 130. During typical operating conditions, the battery charging voltage may be the maximum value when there is a demand for auxiliary battery charging. When there is no demand for auxiliary battery charging, the battery charging voltage may be set to the auxiliary battery voltage or a default value that prevents it from being the maximum. If there is no demand for battery charging and at least one of the voltage-sensitive loads 202 are activated, one of the target voltages associated with the voltage-sensitive loads 202 may typically be the maximum value. When a voltage-sensitive load 202 is inactive, the associated target voltage may be set to the auxiliary battery voltage or a default value that prevents it from being the maximum. In most cases, the float voltage may be the maximum when there is no demand for auxiliary battery charging and no voltage sensitive loads 202 are activated.

At operation 322, a check is made for a key-off cycle. For example, a key-off cycle may be detected when the ignition switch is moved to an off position or stop button is pressed. If a key-off cycle is detected, the sequence starting at operation 302 is repeated. If a key-off cycle is not detected, the sequence of operations starting with operation 312 is repeated.

The voltage control system disclosed manages the voltage of the low-voltage bus 154 to improve fuel economy. The voltage level of the low-voltage bus 154 is managed to a level that provides a suitable operating voltage when electrical loads are activated. By actively managing the voltage level of the low-voltage bus 154, fuel economy is improved and electrical loads are operated at optimal levels.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a power converter electrically coupled to an auxiliary battery;
   a current sensor configured to measure a current flowing through the auxiliary battery; and
   a controller programmed to command an output voltage of the power converter to a voltage that is a maximum of (i) target voltages associated with electrical loads that are electrically coupled to the auxiliary battery and activated, (ii) a battery charging voltage when a demand for auxiliary battery charging is present, and (iii) a float voltage associated with the auxiliary battery and, responsive to the output voltage being commanded to the float voltage, control the current by adjusting the float voltage such that a predetermined current flows to the auxiliary battery.

2. The vehicle of claim 1, wherein the float voltage is an open-circuit voltage of the auxiliary battery.

3. The vehicle of claim 1, wherein the float voltage is a predetermined offset greater than an open-circuit voltage of the auxiliary battery such that no current flows from the auxiliary battery.

4. The vehicle of claim 1, wherein the predetermined current is zero.

5. The vehicle of claim 1, wherein the float voltage is based on a state of charge of the auxiliary battery.

6. A vehicle voltage control system comprising:
   a power converter electrically coupled to an auxiliary battery;
   a current sensor configured to measure a current flowing through the auxiliary battery; and
   a controller programmed to command an output voltage of the power converter to a voltage that is a maximum of (i) target voltages associated with electrical loads that are activated, (ii) a battery charging voltage when a demand for auxiliary battery charging is present, and (iii) a float voltage associated with the auxiliary battery, and, responsive to the output voltage being the float voltage, measure the current and adjust the float voltage such that no current flows through the auxiliary battery.

7. The vehicle voltage control system of claim 6, wherein the float voltage is an open-circuit voltage of the auxiliary battery.

8. The vehicle voltage control system of claim 6, wherein the float voltage is a predetermined offset greater than an open-circuit voltage of the auxiliary battery such that no current flows from the auxiliary battery.

9. The vehicle voltage control system of claim 6, wherein the target voltages are voltages for achieving expected performance levels of corresponding electrical loads.

10. A method comprising:
    operating, by a controller, a power converter electrically coupled to an auxiliary battery and a plurality of electrical loads at an output voltage that is a maximum of (i) target voltages associated with each of the electrical loads that are activated, (ii) a charging voltage for the auxiliary battery when a demand for auxiliary battery charging is present, and (iii) a float voltage associated with the auxiliary battery, and
    measuring, by the controller, a current flowing through the auxiliary battery, and, responsive to the electrical loads being deactivated, adjust the float voltage to minimize the current.

11. The method of claim 10 further comprising receiving, by the controller, a message, from control modules associated with the electrical loads, indicative of an activation status of each of the electrical loads and setting the target voltages for the electrical loads based on the activation status.

12. The method of claim 10 further comprising receiving, by the controller, a message, from control modules associated with the electrical loads, indicative of the target voltages.

13. The method of claim 10, wherein the float voltage is an open-circuit voltage of the auxiliary battery.

14. The method of claim 10, wherein the float voltage is a predetermined offset greater than an open-circuit voltage of the auxiliary battery such that no current flows from the auxiliary battery.

15. The method of claim 10, wherein the float voltage is based on a state of charge of the auxiliary battery.

* * * * *